United States Patent
Idstrom et al.

(10) Patent No.: US 11,728,932 B2
(45) Date of Patent: Aug. 15, 2023

(54) COMMUNICATION SYSTEM WITH IMPROVED RELIABILITY

(71) Applicant: Apple Inc., Cupertino, CA (US)

(72) Inventors: Courtland M. Idstrom, San Mateo, CA (US); Alvin L. Lai, San Jose, CA (US); Pablo P. Cheng, Chino Hills, CA (US); Yasser Rihan, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/320,208

(22) Filed: May 13, 2021

(65) Prior Publication Data
US 2022/0103296 A1    Mar. 31, 2022

Related U.S. Application Data

(60) Provisional application No. 63/083,795, filed on Sep. 25, 2020.

(51) Int. Cl.
*H04L 1/16*     (2006.01)
*H04L 67/131*   (2022.01)
*H04L 1/00*     (2006.01)
*H04L 1/1607*   (2023.01)

(52) U.S. Cl.
CPC .......... *H04L 1/1607* (2013.01); *H04L 1/0023* (2013.01); *H04L 67/131* (2022.05)

(58) Field of Classification Search
CPC ... H04L 1/1607; H04L 1/0023; H04L 67/131; H04L 69/16; H04L 1/1835; H04L 1/1858; H04L 1/188
See application file for complete search history.

(56) References Cited

U.S. PATENT DOCUMENTS

| | | | |
|---|---|---|---|
| 9,158,375 B2 | 10/2015 | Maizels et al. | |
| 9,383,582 B2 | 7/2016 | Tang et al. | |
| 9,488,488 B2 | 11/2016 | Waldman | |
| 9,685,004 B2 | 6/2017 | Wang et al. | |
| 10,360,195 B1* | 7/2019 | McKelvie | G06F 16/22 |
| 11,210,184 B1* | 12/2021 | Gupta | G06F 11/1471 |
| 2010/0211554 A1* | 8/2010 | Reid | G06F 16/2358 707/703 |
| 2012/0303581 A1* | 11/2012 | Calder | G06F 16/27 707/626 |

(Continued)

FOREIGN PATENT DOCUMENTS

WO    2014105264    7/2014

*Primary Examiner* — Yaotang Wang
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to improving the reliable of a computing network. A first computing device receives changing states of a data object to send to a second computing device via a network interface. The first computing device sends, to the second computing device, a baseline packet having a complete one of the states of the data object. The first computing device sends, to the second computing device, a sequence of update packets corresponding to the changing states of the data object. An update packet in the sequence includes sufficient information to update a stored state of the data object at the second computing device to a current state of the data object responsive to the stored state being one of two or more previous ones of the states.

20 Claims, 13 Drawing Sheets

(56) References Cited

U.S. PATENT DOCUMENTS

| | | |
|---|---|---|
| 2013/0254620 A1 | 9/2013 | Zhou et al. |
| 2016/0203648 A1 | 7/2016 | Bilbrey et al. |
| 2020/0312005 A1 | 10/2020 | Desai et al. |
| 2023/0023893 A1 | 1/2023 | Venkataraman et al. |

* cited by examiner

COMMUNICATION SYSTEM WITH IMPROVED RELIABILITY

The present application claims priority to U.S. Prov. Appl. No. 63/083,795, filed Sep. 25, 2020, which is incorporated by reference herein in its entirety.

BACKGROUND

Technical Field

This disclosure relates generally to computing networks, and, more specifically, to improving the reliability of a computing network experiencing packet loss.

Description of the Related Art

Computer networks typically implement their transport control layers using either the transmission control protocol (TCP) or user datagram protocol (UDP). TCP is preferred for many communications as it provides greater reliability, in part, due to its use of network sessions and packet acknowledgements. Setting up a network session and sending acknowledgments for every received packet, however, can add a significant amount of overhead—particularly when one device is communicating with multiple other devices. Moreover, when packets are dropped, waiting for a retransmission timeout (or for a recipient to send a duplicate acknowledgment indicating a missed packet) can introduce significant latency into a communication as a recipient waits for the sender to resend the dropped-packet content. In latency-sensitive communications, UDP may be used as an alternative to TCP as UDP forgoes these additional overheads. UDP, however, is less reliable, so recipients may need to be more tolerant of packet loss. While some attempts have been made to improve the reliability of UDP (such as reliable UDP (RUDP)), these attempts still rely heavily on the use of acknowledgments and thus suffer from many of the same deficiencies as TCP.

Figure 1:
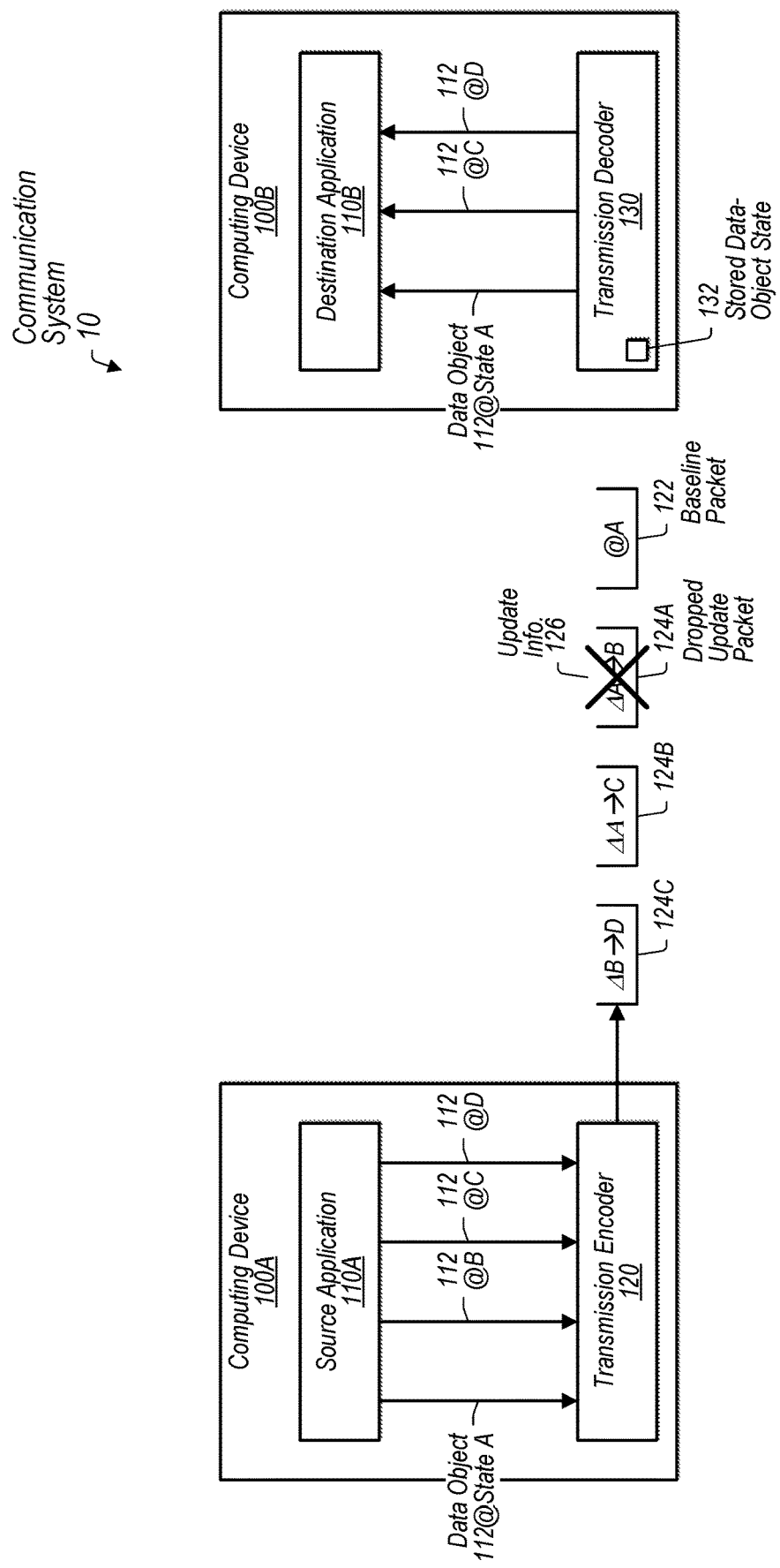
FIG. 1 is a block diagram illustrating an example of a communicating system configured to provide improved reliability during packet loss between two or more computing devices.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "neural network engine configured to implement a neural network" is intended to cover, for example, circuitry performing this function during operation, even if the circuitry in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the "first" and "second" processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

A physical environment refers to a physical world that people can sense and/or interact with without aid of electronic systems. The physical environment may include physical features such as a physical surface or a physical object. For example, the physical environments may correspond to a physical park that includes physical trees, physical buildings, and physical people. People can directly sense and/or interact with the physical environment, such as through sight, touch, hearing, taste, and smell.

In contrast, an extended reality (XR) environment (or a computer-generated reality (CGR) environment) refers to a wholly or partially simulated environment that people sense and/or interact with via an electronic system. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect a person's head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

A person may sense and/or interact with an XR object using a gesture or any one of their senses, including sight, sound, and touch. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

A mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

DETAILED DESCRIPTION

The present disclosure describes embodiments in which communicating devices may use one or more techniques to improve the reliability of network communications while also reducing the likelihood that a latency hit is incurred when packets are dropped. As will be described below, a first computing device may want to communicate changing states of various data objects over a network to a second computing device (or multiple destination devices). As one example, the computing devices may be executing a distributed gaming application that presents an online virtual world and wants to convey changing states of virtual objects among the computing devices. In various embodiments, an encoder of the first computing device receives changing states of a given data object over time and analyzes the states to determine how they differ from one another. Based on these differences, the encoder sends, to the second computing device, a sequence of update packets corresponding to the changing states of the data object. In such an embodiment, a given update packet sent for a current state includes update information that is sufficient to update, not only the prior state of the data object to its current state, but also one or more additional prior states to the current state. For example, in one embodiment discussed below, a given update packet may include enough information to update up to five previous states of a data object to a current state of the data object. The encoder may begin by sending an initial state of the data object in a baseline packet having the complete state of data object. A decoder at a destination device may then store this state and apply update information from subsequently received update packets to update the stored state of the data object to the current state of the data object.

If a given update packet for a particular state is dropped (or event multiple packets for multiple states are dropped, in some embodiments), the destination device is still able to update its stored state of the data object to a current state using the update information included in the next received packet. In doing so, the destination device can forgo having to request a retransmission of the dropped update packet—and thus avoid the latency hit incurred while waiting for the sending device to detect the dropped packet and resend it. Furthermore, this improved reliability, in various embodiments, can enable communicating devices to forgo use of acknowledgment packets (such as used in TCP), which can reduce the consumption of upstream bandwidth. Moreover, supporting acknowledgment packets can consume considerable amounts of memory on the sender's side as a sending device may need to buffer sent packets until they can be acknowledged by the recipient. In some embodiments, this resource consumption can be avoided using the techniques described herein.

Turning now to FIG. 1, a block diagram of a communication system 10 is depicted. In the illustrated embodiment, communication system 10 includes two or more communicating computing devices 100, which may correspond to (or be included within) any of various computing devices such as a phone, tablet, laptop, desktop computer, etc. In some embodiments discussed below, computing devices 100 may also be head mounted displays, such as, a headset, helmet, goggles, glasses, a phone inserted into an enclosure, etc. In the illustrated embodiment, a computing device 100A sending packets includes a source application 110A and a transmission encoder 120. A computing device 100B receiving packets includes a destination application 110 and a transmission decoder 130. In some embodiments, computing devices 100 may be implemented differently than shown. For example, computing device 100A may be communicating packets to multiple receiving computing devices 100B such as in a multicast implementation, multiple data objects 112 may be communicated in one or more both directions, etc. Various examples of other components, which may be included in computing devices 100 (e.g., network interfaces), will be discuss below with respect to FIG. 12.

Applications 110, in various embodiments, are programs executable to perform activities that entail communicating data objects 112—and that may be particularly latency sensitive. Accordingly, in some embodiments, applications 110 implement an extended reality XR experience, which may leverage AR, MR, VR, or some other form of computer generated reality (CGR) generated content. As one example, applications 110 may provide a co-presence experience in which multiple users can interact with one another using their respective devices in a shared XR environment—thus, communicated data objects 112 may pertain to a user's avatar, items in the environment that users are interacting with, or other content being rendered by applications 110. As another example, an application 110 may support streaming of real-time content such as live sporting events, concerts, etc.—thus, data objects 112 may pertain three dimensional video or audio content being presented by applications 110. As yet another example noted above, applications 110 may include gaming applications that place the user in an XR environment in which the user is able interact with computer generated objects, which may have theirs states tracked using data objects 112. In other embodiments, a computing device 100A may be a user interface device (e.g., a wireless stylus) that quickly communicates changing states of data objects 112 corresponding to a user's movements to a computing device 100B quickly acting on those movements.

Data objects 112 may broadly correspond to any suitable data type being communicated between two applications 110. In some embodiments, data objects 112 can be primitive data types such as integers, floating point numbers, Booleans, strings, etc. In some embodiments, data objects 112 can be more complex data structures that include multiple primitive data types such as structs, arrays, dictionaries, buffers, trees, graphs, etc. In some embodiments, data objects 112 can be expressed using a language-independent data format such as JavaScript object notation (JSON), extended markup language (XML), etc. In some embodiments, data objects 112 are small enough that a complete/entire state can be conveyed within a single packet. In various embodiments, when source application 110A wants to communicate states of a data object 112 to destination application 110B, application 110A sends a corresponding request to encoder 120 and begins supplying the changing states of the data object 112 to encoder 120.

Transmission encoder 120, in various embodiments, is executable to facilitate encoding states of a data object 112 for transmission via a network interface to another computing device 100B. As shown, for example, encoder 120 may receive states A, B, C, and D of a data object 112, which may represent changing states of the data object 112 over time. Based on these received states, encoder 120 may send a sequence of packets including a baseline packet 122 followed by one or more update packets 124. In the illustrated embodiment, a baseline packet 122 is a packet that includes the complete state of the data object 112, which may be sent for the initial state of a data object 112 and prior to computing device 100B having any copy of the data object 112. For example, as shown, encoder 120 may send a baseline packet 122 including the complete state A of a data object 112—which may be the initial state in the depicted example. In the illustrated embodiment, encoder 120 then sends an initial update packet 124A that includes update information 126 sufficient to update the prior communicated state of the data object 112 to the current state—e.g., update prior state A to current state B (shown using ΔA→B in FIG. 1). In some instances, the update information 126 included in update packets 124 may be only the information that has changed from one state (or states) to the current state (as opposed to the complete/entire current state). For example, if data object 112 includes two integers and only one has been updated with the state change, information 126 may include the updated integer value but not the unchanged integer value.

In various embodiments, encoder 120 continues to send subsequent update packets 124 that include update information 126 sufficient to update any of multiple previous states to a current state. That is, a recipient does not need to request information in addition to what already included in update information 126 of a given packet 124 and the information included in a previous state of a data object 112 in order to generate a current state of the data object 112. For example, update packet 124B includes update information 126 sufficient to update any of states A and B (and even C as will be discussed) to the current state of C without further information. In various embodiments, the previous states supported by a given update packet 124 are staggered so that they overlap with the states supported by a previously transmitted packet 124. For example, packet 124C supports states B-D (shown using ΔB→D in FIG. 1), which overlaps with states B & C of the range of states A-C supported by packet 124B (shown using ΔA→C in FIG. 1).

Transmission decoder 130, in various embodiments, is executable to decode information in packets 122 and 124 in order to provide complete states of a data object 112 to destination application 110B. To provide these states to application 110B, in the illustrated embodiment, decoder 130 stores a copy 132 of a received state of the data object 112, which it updates based on update information 126. This stored state 132 may initially be the complete state of the data object 112 received in a baseline packet 122 such as state A in the example depicted in FIG. 1. As update packets 124 are received, decoder 130 may read the update information 126 included in packets 124 and apply the information 126 to stored state 132 to update state 132 to the current state. Accordingly, in response to receiving update packet 124A and stored state 132 being at state A, decoder 130 may use the update information 126 in packet 124A to update stored state 132 from state A to state B, which decoder 130 may then provide to application 110B. In various embodiments, decoder 130 determines whether the update information 126 in a given packet 124 can be applied to the stored state 132 by reading, from the packet 124, the range of previous states (e.g., states B-D in packet 124C) for which the update information 126 can be applied to produce the current state of the data object 112 and determining whether the stored state 132 of the data object 112 is within the range (e.g., stored state 132 is one of B-D).

In the exampled depicted in FIG. 1, however, packet 124A has been dropped in communication to computing device 100B. In the illustrated embodiment, decoder 130 is still able to update the stored state 132 from state A to state C using packet 124B as it includes update information 126 sufficient to, not only update from state B to state C, but also update from state A to state C. Although, in some embodiments, decoder 130 may not be able to advance stored state 132 to state B in this example, decoder 130 can avoid requesting a retransmission of update packet 124A—as well as having to wait for it from computing device 100A. Also, the range of previous states supported by an update packet 124 may be selected such that an inability to update stored state 132 is a rare occurrence. When such an event does occur, in some embodiments, computing device 100A does not buffer prior transmitted update packets 124 and, instead, can merely send another baseline packet 122 having the current state of data object 112—which may be sent in response to a negative acknowledgment in some embodiments as will be discussed with respect to FIG. 8 below.

Encoder 120 and decoder 130 may be implemented by any of various components within computing devices 100A and 100B. In some embodiments, encoder 120 and decoder 130 are components of applications 110. In other embodiments, encoder 120 and decoder 130 are components of an operating system executed by computing devices 100 that provides an application programming interface (API) through which applications 110 can make API calls to request use of encoder 120 and decode 130. In still other embodiments, encoder 120 and decoder 130 may be implemented by network interface cards (NICs) of computing devices 100—thus, applications 110 may make API calls to the underlying drivers of the NICs. Also, although computing device 100A is shown as including only encoder 120, device 100A may also include a decoder 130; device 100B may also include an encoder 120.

Operations performed by encoder 120 and decoder 130 will now be described in greater detail with respect to FIGS. 2 and 3, respectively.

Figure 2:
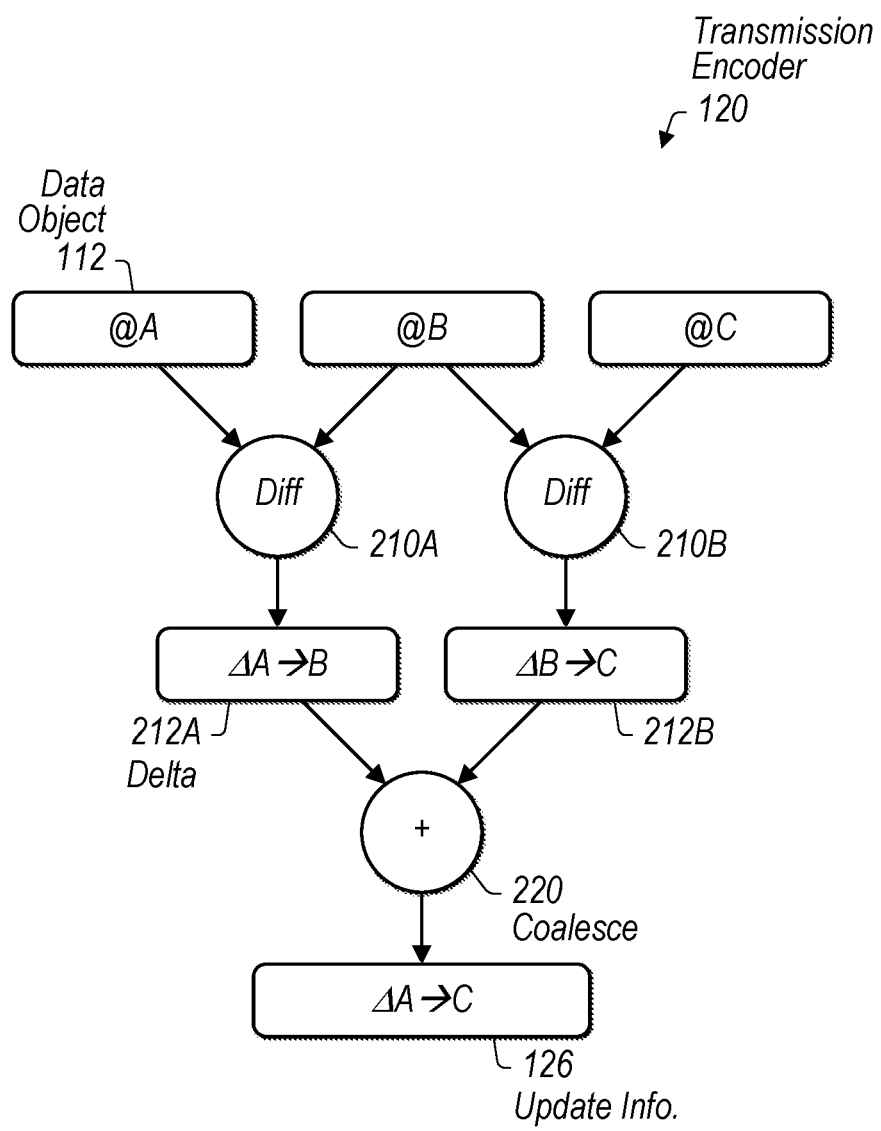
FIG. 2 is a block diagram illustrating an example of a transmission encoder included in a computing device.

Turning now to FIG. 2, a block diagram of a transmission encoder 120 is depicted. In the illustrated embodiment, encoder 120 is executable to perform one or more difference operations 210 for received states of a data object 112 and a coalesce operation 220 to produce update information 126. In other embodiments, encoder 120 may be implemented differently than shown.

Difference operations 210, in various embodiments, compare two states of a data object 112 to identify any differences. Accordingly, if a data object 112 is a primitive data type, a difference operation 210 may merely determine whether the value of the primitive data type of one state has been replaced with a new value in another state. In cases where a data object 112 is a more complex data structure, a difference operation 210 may include crawling the data structure to see what components have changed from one state to another. Once these differences have been identified, an operation 210 may output the information to go from one state to the next in the form of a delta 212. Deltas 212 may generally define what operations (e.g., additions, updates, or removals of components) are needed to alter a state of a data object 112 to obtain the next state. For example, as shown a difference operation 210A may be applied to states A and B of a data object 112 to produce a delta 212A having information sufficient to go from a stored state 132 of state A and to the state B. A difference operation 210AB may similarly be applied to states B and C of the data object 112 to produce a delta 212B having information sufficient to go from a stored state 132 of state B and to state C. In various embodiments, deltas 212 have the property of idempotency—meaning a delta 212 applied twice to a state results in the same state as applying it once. Deltas 212 also have the property of being mergeable/collapsible.

Coalesce operation 220, in various embodiments, combines multiple deltas 212 into a single set of update information 126, which can be included in a payload of an update packet 124. For example, as shown, coalesce operation 220 produces update information 126 sufficient to update a stored state 132 from either state A or state B to state C shown as (shown as ΔA→C). In some embodiments, coalesce operation 220 includes comparing deltas 212 to see what addition, updates, and/or removals of earlier states are rendered obsolete by later additions, updates, and/or removals of subsequent states. For example, if a component of a data object 112 is updated at state B but then removed at state C, update information 126 may include the removal action from state C but not the update action of state B. In various embodiments, update information 126 is also idempotent and further mergeable—a property that may allow for creation of multi-rate streams of update packets 124 as will be discussed with FIG. 10.

Figure 3:
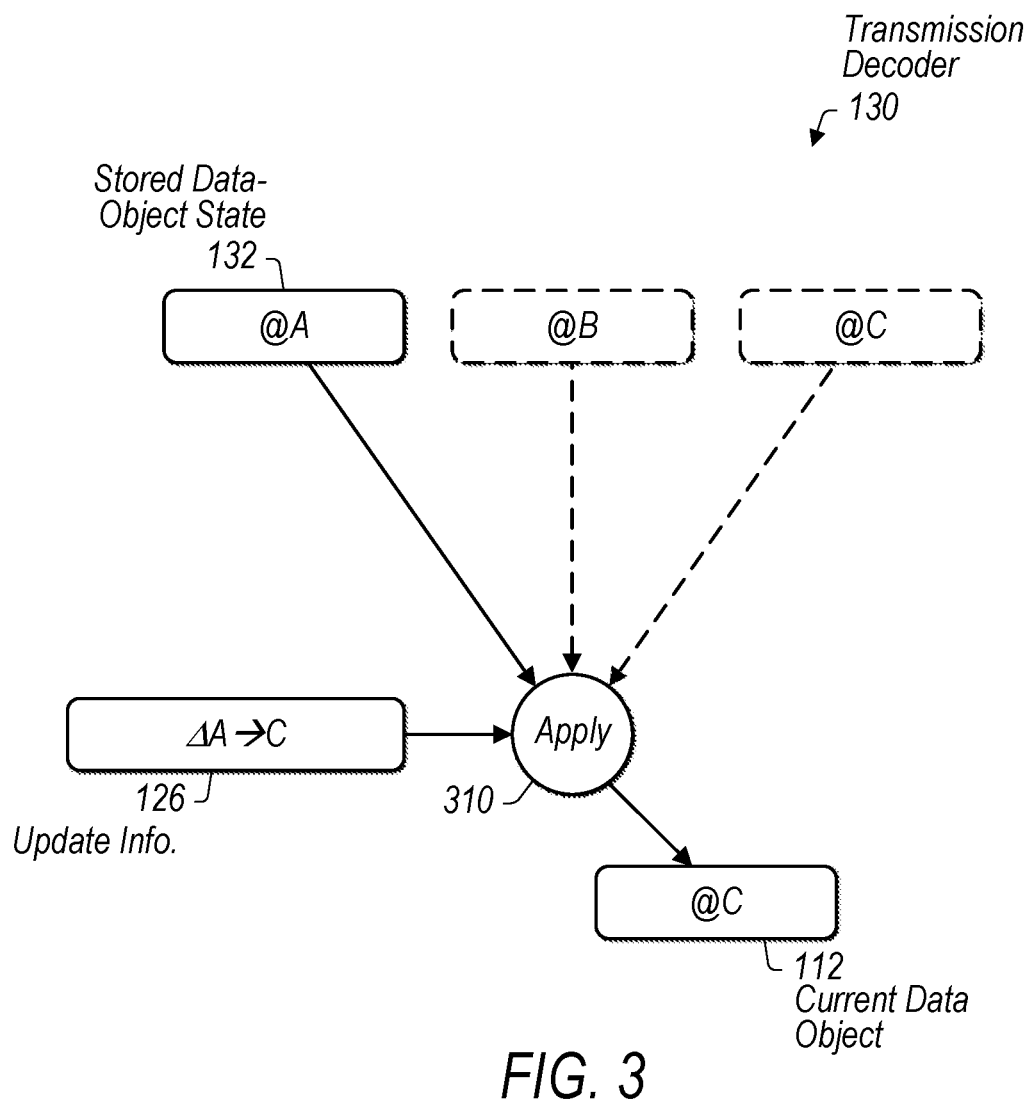
FIG. 3 is a block diagram illustrating an example of a transmission decoder included in a computing device.

Turning now to FIG. 3, a block diagram of transmission decoder 130 is depicted. In the illustrated embodiment, decoder 130 performs an apply operation 310 to produce a current state of the data object 112. In other embodiments, decoder 130 may be implemented differently than shown.

Apply operation 310, in various embodiments, reads the stored state 132 of a data object 112 and performs the various additions, updates, and/or removals as indicated by update state information 126 to obtain the current state of a data object 112 from the stored state 132. Prior to performing these actions, operation 310 may include examining update information 126 to see what previous states are supported in order to determine whether the stored state 132 of the data object is within that range. In the example depicted in FIG. 3, the update information 126 is applied to a stored state 132 of state A to produce state C of a data object 112. States B and C, however, are also shown as the depicted update information 126 may also be applied to state B—as well as to state C because of the idempotent property of update information 126.

An example of changing states of a data object 112 and corresponding update information 126 will now be discussed with FIG. 4.

Figure 4:
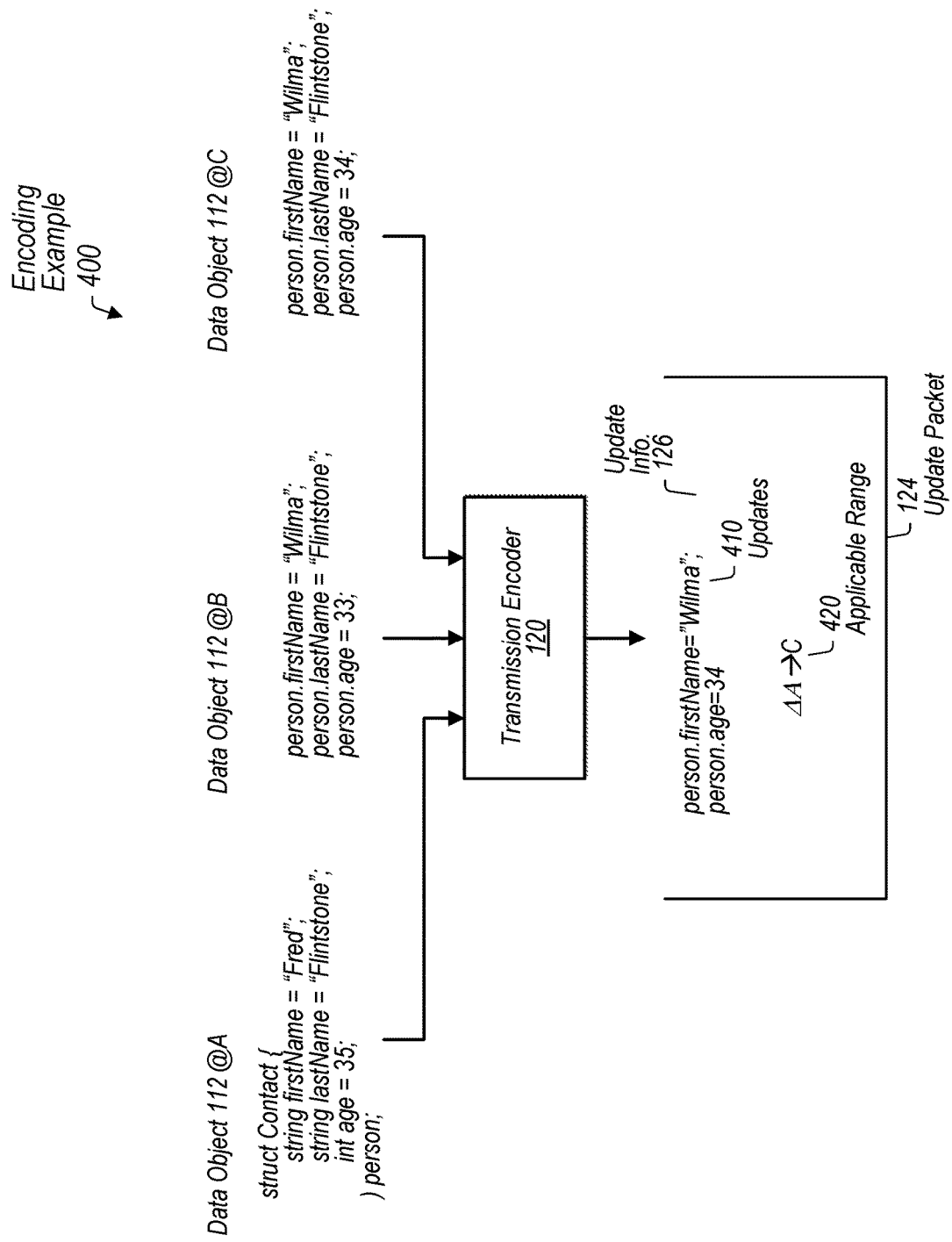
FIG. 4 is a block diagram illustrating an example of encoding content for communication in an update packet.

Turning now to FIG. 4, a block diagram of an encoding example 400 is depicted. As noted above, data object 112 may be any of various suitable data types. In the illustrated embodiment, however, data object 112 is a struct data structure including two string data types (e.g., corresponding to a person's first and last names) and an integer data type (e.g., corresponding to a person's age). As shown, the data object 112 at state A may initially have the values Fred, Flintstone, and 35. At state B, the first name and age may be changed such that the data object 112 now has the values Wilma, Flintstone, and 33. At state C, data object 112's age is then updated to 34. Application 110A may provide these states to encoder 120 to have them conveyed to application 110B.

As discussed above with FIG. 2, encoder 120 may determine the differences of these states through performance of difference operations 210 and merge the results via a coalesce operation 220 to produce update information 126. In the illustrated embodiment, update information 126 includes updates 410 corresponding to the components of data object 112 that have changed and an applicable range 420 for which update packet 124 is applicable. Since the first name and age were updated in states B and C, corresponding updates 410 are included in update information 126 to indicate what changes should be made. As the update information 126 is used to update a stored state 132 to a state of C (and not a state of B), the age of 33 is not included in the information as it is later overwritten to the value 34. The range 420 of states A to C is specified as updates 410 can be applied to any one of states A, B, and C to obtain the current state of state C. When a computing device 100B receives update packet 124, device 100B may determine whether the included update information 126 can be applied to its stored state 132 by reading a range 420 from packet 124.

Figure 5:
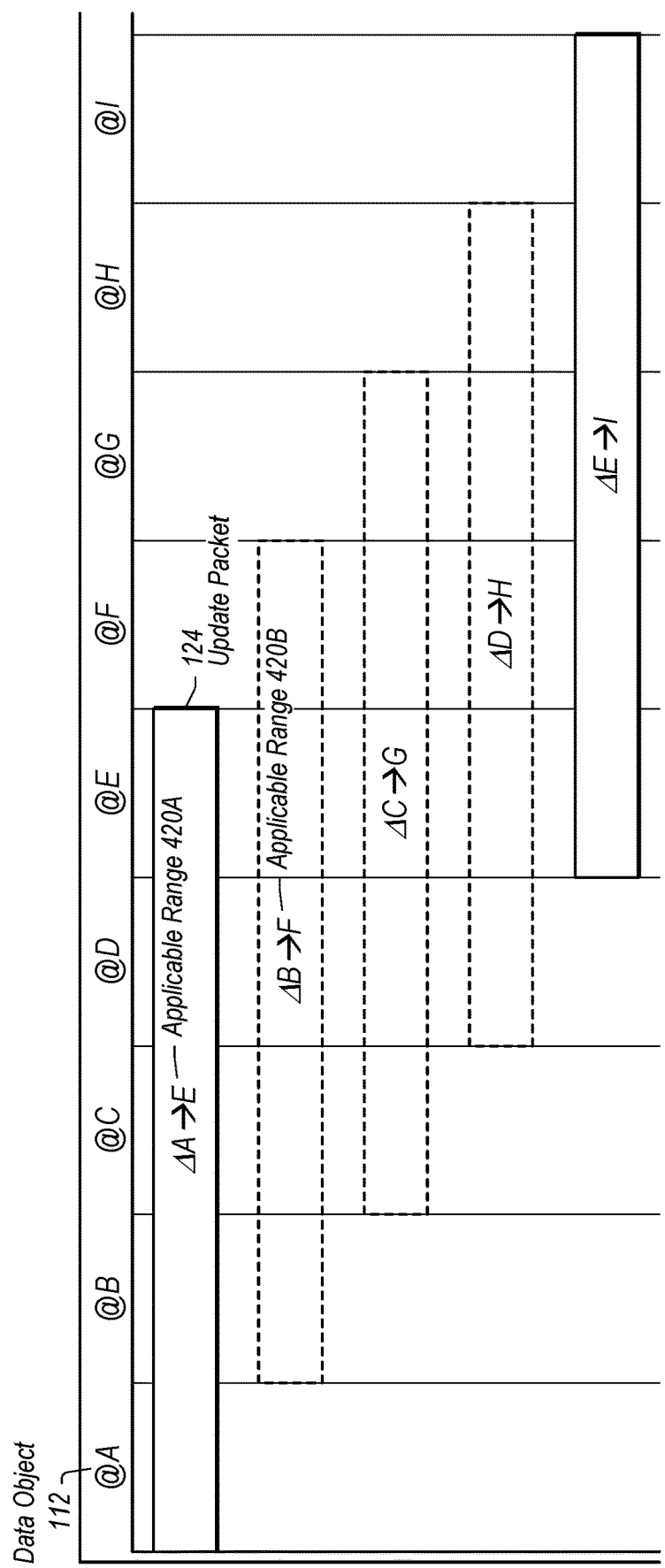
FIG. 5 is a block diagram illustrating an example of using staggered overlapping ranges in update packets being communicated.

Turning now to FIG. 5, a block diagram of staggered-overlapping ranges 500 is depicted. As noted above, the update information 126 included a sequences of update packets 124 may be staggered such that range 420 of a given packet 124 overlaps with the ranges 420 of one or more of the preceding and succeeding packets 124. In the illustrated example, five update packets 124 are transmitted for a data object 112 transitioning through states E-I. Each packet 124 includes sufficient update information 126 to update four previous states to a current packet. Accordingly, the first packet 124 sent for state E includes update information 126 sufficient to update a stored state 132 for a first range of previous states A-D. The second packet 124 sent for state F includes update information 126 sufficient to update a stored state 132 for a second range of previous states B-E, which overlaps with the first range for states B-D. By using a range 420 of four previous states, decoder 130 can still update stored state 132 to a current state I even if the three middle packets are dropped in transmission since decoder 130 can still use the update information 126 in the fifth packet to update the stored state 132 from state E to state I.

Figure 6:
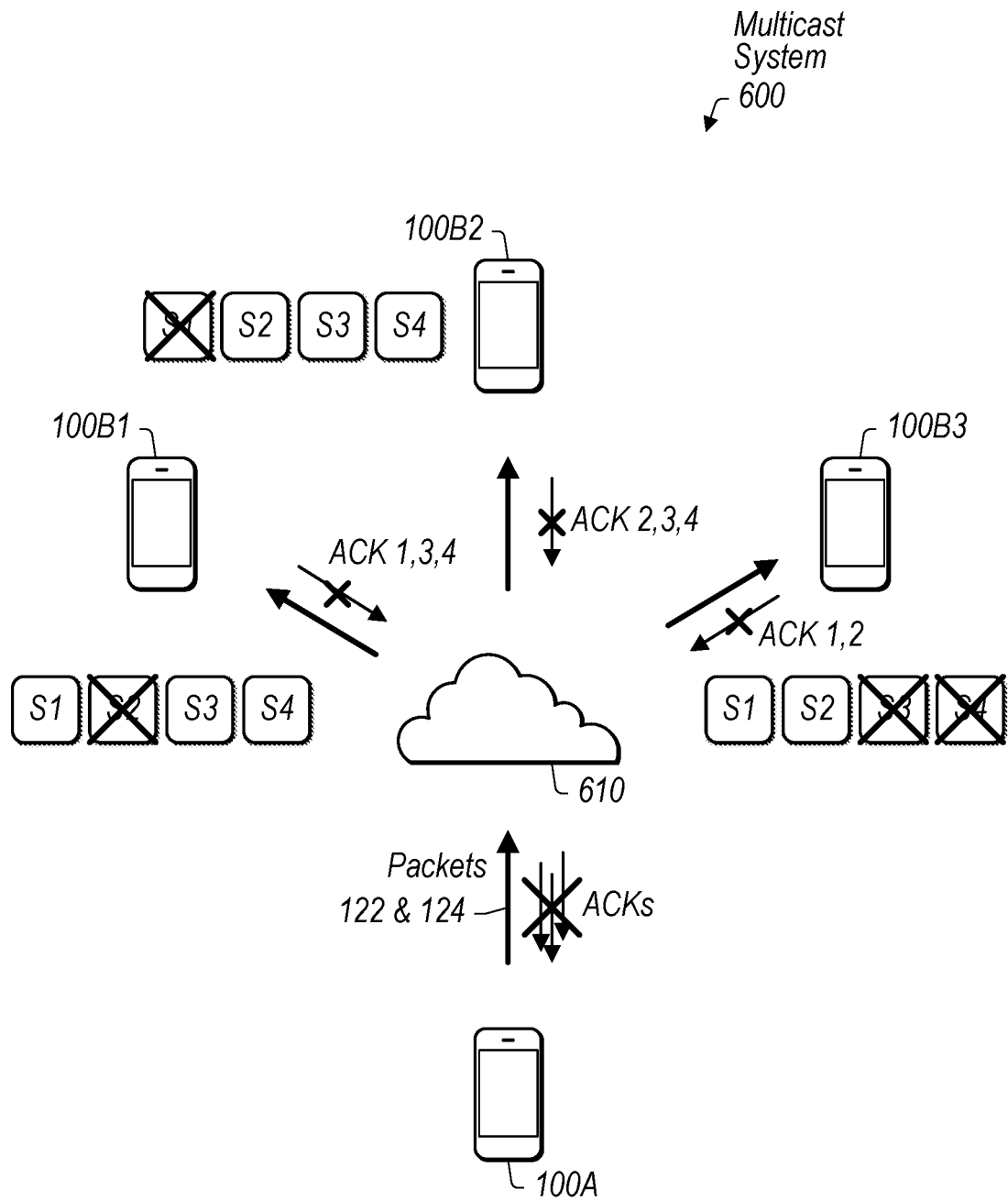
FIG. 6 is a block diagram illustrating an example of a multicast system.

Turning now to FIG. 6, a block diagram of a multicast system 600 is depicted. In some instances, the techniques described herein may be particularly beneficial for multicast communications in which a source sends content to multiple recipients. For example, as shown, a computing device 100A may attempt to transmit packets 122 and 124 for four states of a data object 112 shown as S1-S4. As shown, however, some packets corresponding to these state changes may be lost in communication. One approach to account for these lost packets and improve the reliability of system 600 would be to send acknowledgment packets (shown as ACKs) responsive to every received packet, so that computing device 100A can confirm that a packet was received. This approach, however, may result in a large number of acknowledgment packets being sent as there may be dozens, hundreds, or even thousands of receiving computing devices 100B in some embodiments—and potentially multiple data objects 112 being conveyed. This may make such an approach quickly infeasible due to a device 100A's power, bandwidth, processing, and/or other constraints.

In contrast, multicast system 600, in the illustrated embodiment, forgoes use of acknowledgment packets for update packets 124 as the ability to support updating from multiple prior states may make communications reliable enough for the purposes of the multicast. For example, if a range 420 of five states is implemented and a 1% packet loss occurs, five consecutive packets may need to be dropped for a given data object 112 before a recipient is unable to update its stored state 132—an event that has a likelihood of 1 in 10,000,000,000. In addition to reducing the amount of bandwidth consumed by receiving acknowledgment packets, a computing device 100A may also consume far less memory resources as a sender supporting acknowledgment packets typically buffers packets until their receptions are confirmed, which would entail tracking the last received packets of each recipient.

To further reduce the likely of needing to resend update packets 124 (or send baseline packets 122), computing devices 100 may employ one or more additional techniques. As will be discussed with FIG. 7, in some embodiments, a computing device 100A can use opportunistic range stretching to increase the range of previous states covered by a given update packet 124. As will be discussed with FIG. 8, in some embodiments, a computing device 100B can use negative acknowledgments and convey them over a separate, more reliable connection than the connection used to receive update packets 124. As will be discussed with FIG. 9, in some embodiments, a computing device 100A can send out a confirmation packet indicative of the current state when the state of a data object 112 has not changed for some time. As will be discussed with FIG. 10, in some embodiments, a computing device 100A can send out multiple streams of update packets 124 where packets of a given stream support a particular range 420 that is different than the ranges 420 of packets in other streams.

Figure 7:
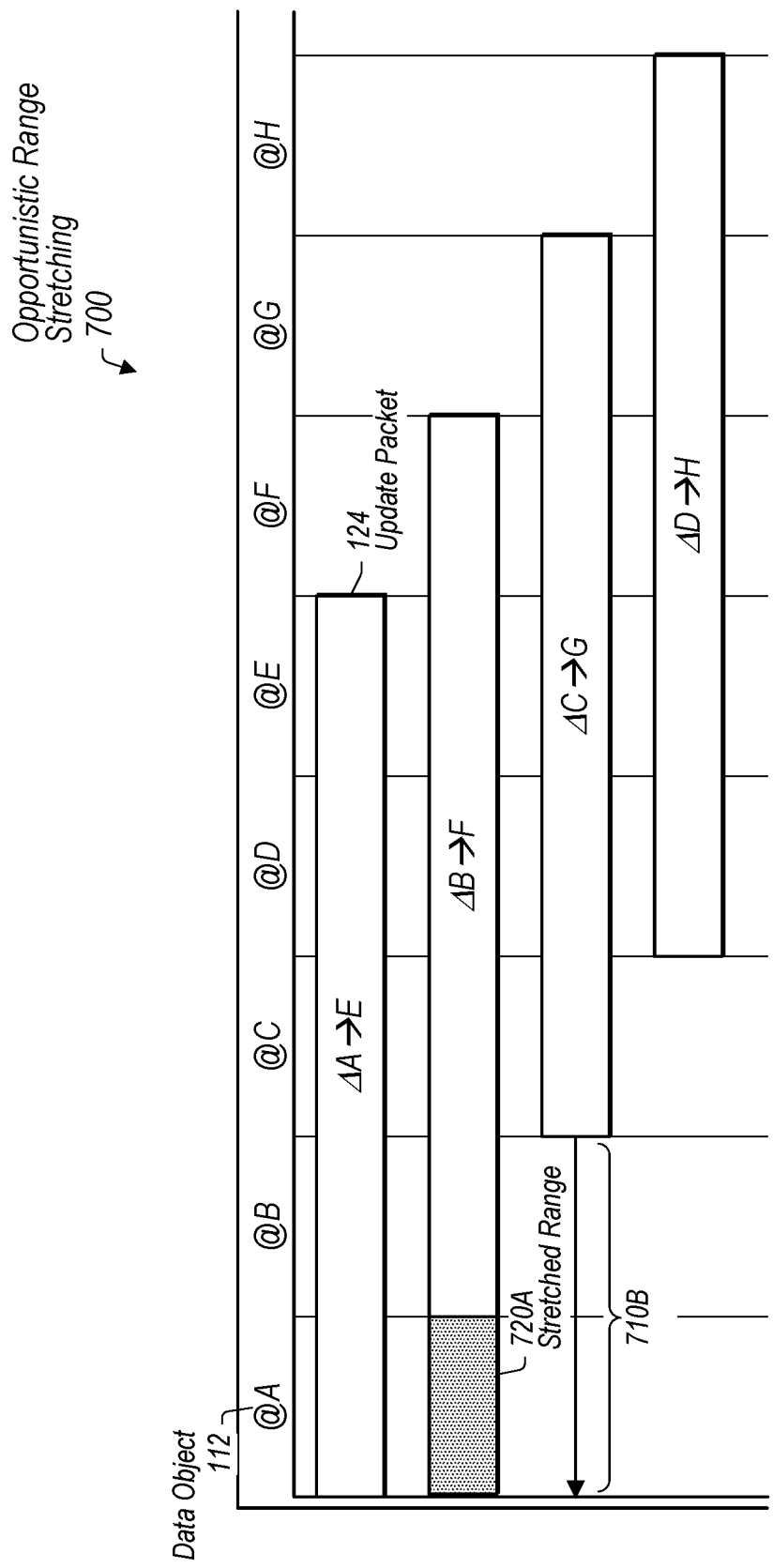
FIG. 7 is a block diagram illustrating an example of opportunistic range stretching.

Turning now to FIG. 7, a block diagram of opportunistic range stretching 700 is depicted. In some embodiments, encoder 120 supports a default minimum range 420 for the update packets 124 that it creates. In FIG. 7, for example, this default is four previous states. In some instances, however, the costs of supporting one or more additional previous states may be low enough to justify supporting the additional states for the added resiliency of a larger range 420. Continuing with the exemplary data object 112 discussed above with FIG. 4, if an additional state being considered for inclusion merely updates the age value, only a small amount of additional data (an integer) may need to be included—or in the case that a later supported state replaces this value, no further data may need to be included to support that additional state. In the example depicted in 7, the range 420 of the update packet 124 supporting ΔB→F has been updated to a stretched range 720A now supporting state A. As a result, decoder 130 can now use this packet 124 to update its stored state 132 from a state A without having to request a retransmission if it was unable to update its stored state 132 to, at least, state B beforehand due to one or more dropped packets 124.

In considering whether to stretch the range 420 of a packet 124, in some embodiments, encoder 120 determines the information 126 sufficient to update an initial set of previous states (e.g., some default range) to the current state. Based on the determined information 126, encoder 120 may then determine an amount of additional information 126 sufficient to incorporate one or more additional previous states such as adding states A and B for an extended range 710B as shown in FIG. 7. In response to the amount of additional information being under a threshold amount, encoder 120 may determine to include the additional information in the update packet 124.

Figure 8:
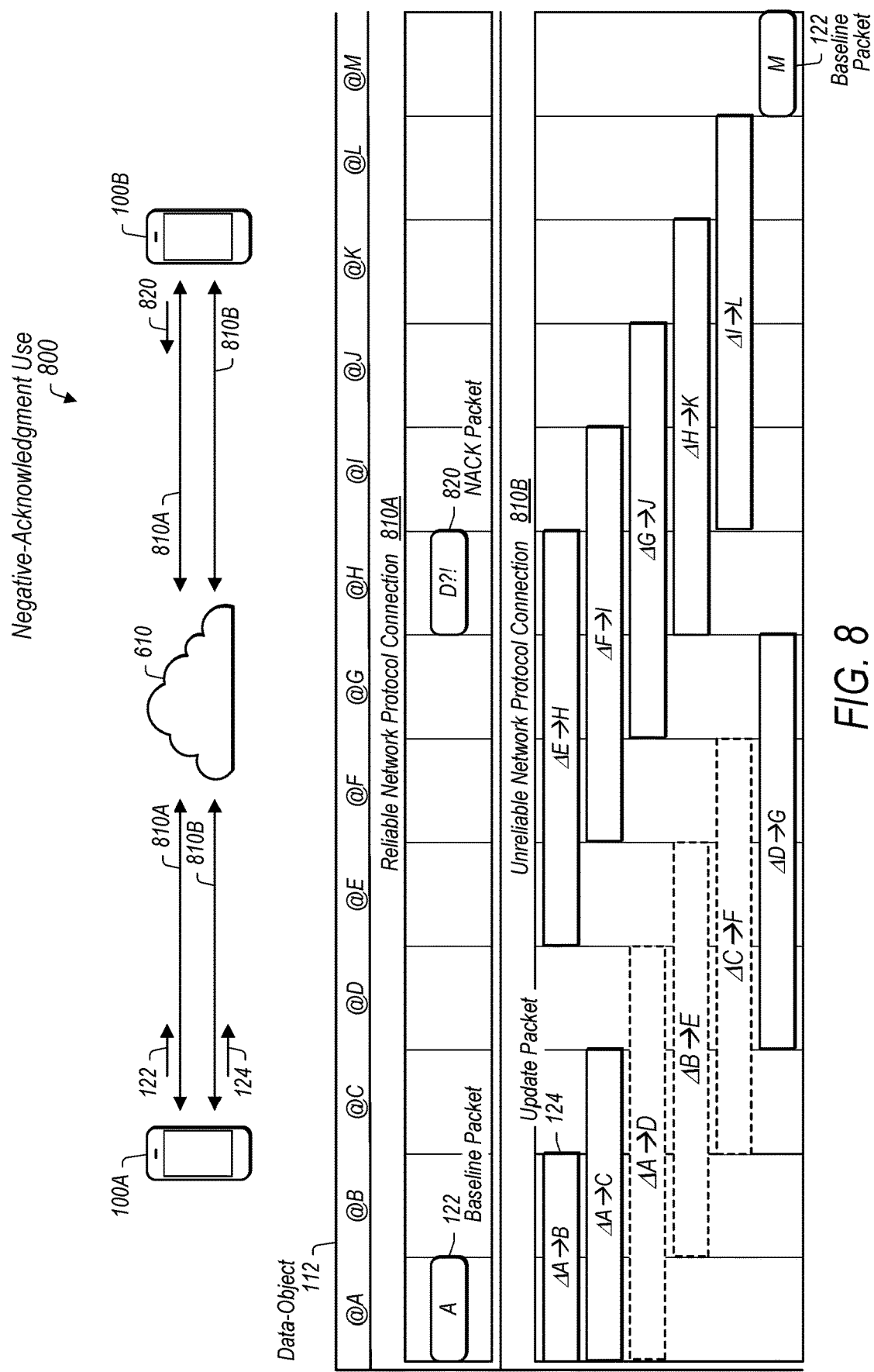
FIG. 8 is a block diagram illustrating an example of using negative acknowledgments.

Turning now to FIG. 8, a block diagram of a negative acknowledgement (NACK) use 800 is depicted. Occasionally, catastrophic loss of packets 124 may occur such that a receiving computing device 100B is unable to update stored state 132 to a current state. For example, as shown in FIG. 8, the packets 124 for ΔA→C, ΔA→D, and ΔC→F have been dropped in communication with computing device 100B, so computing device 100B is unable to advance its stored state 132 from C to D. In various embodiments, computing device 100B accounts for this problematic situation by sending a NACK packet 820 indicating that it is not able to advance to state D. In response, computing device 100B receives a baseline packet 122 having the current state of data object 112. As there may be some delay for the NACK packet 820 to be processed, the state included in the baseline packet 122 may be a later state than the state referenced in the NACK packet 820 such as state M as shown. (In other embodiments, however, computing device 100B may receive a different response to its NACK packet 820 such as the missing update packet 124.) In some embodiments, computing device 100A is the one that receives the NACK packet 820 and issues the corresponding baseline packet 122. In other embodiments, however, a computing device (such as a multicast server) within network 610 receives the NACK packet 820 and provides a corresponding response—such an approach may reduce the load on computing device 100A. In such an embodiment, packet payloads may be encrypted to prevent devices in network 610 from discerning the packet contents.

To reduce the chances of further delay when a NACK packet 820 is sent, in the illustrated embodiment, computing device 100B sends the NACK packet 820 via a connection 810A established using a "reliable" network protocol. As used herein, the term "reliable" network protocol refers to a protocol that uses acknowledgments (ACKs) to confirm the receipt of received packets. In contrast, an "unreliable" network protocol, as used herein, is a protocol that does not use acknowledgment packets. Accordingly, TCP is a reliable protocol as defined herein, but UDP is an unreliable protocol. As noted above, advantages of using a connection 810B established using an unreliable network protocol for conveying update packets 124 include a reduced consumption of upstream bandwidth and not having to track what packets 124 have been received by recipients. In the illustrated embodiment, computing device 100A also sends the baseline packet 122 having the initial state of data object 112 (shown as state A in FIG. 8) via connection 810A; however, when responding to a NACK packet 820, the baseline packet 122 including the requested state is sent via unreliable network protocol connection 810B.

Figure 9:
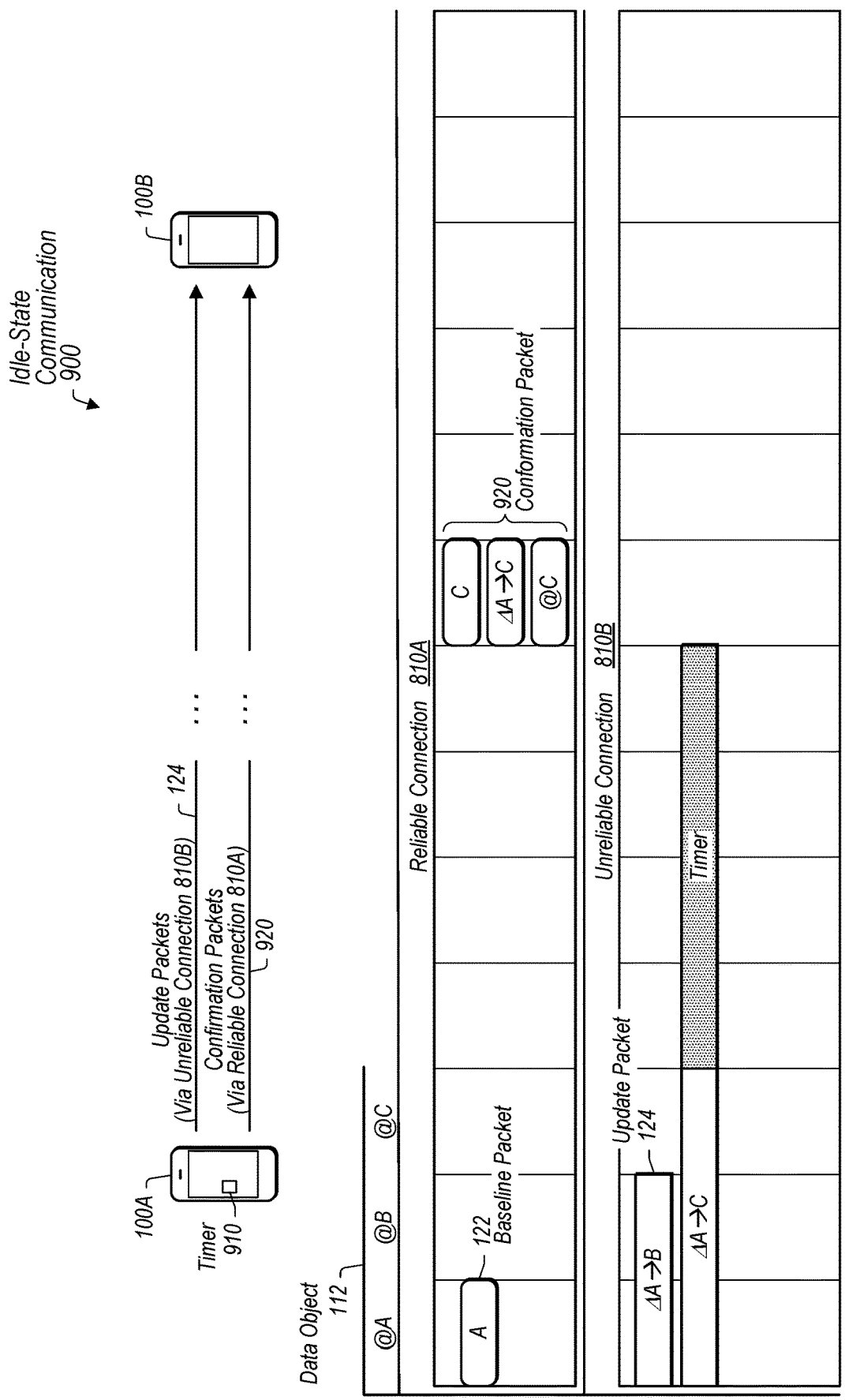
FIG. 9 is a block diagram illustrating an example of an idle-state communication.

Turning now to FIG. 9, a block diagram of idle-state communication 900 is depicted. In some instances, the state of a data object 112 may remain constant for an extended period. When a consistent stream of update packets 124 is being received, missing an update packet 124 may not be problematic as the stored state 132 of a data object 112 may be incorrect for only a short time until another packet 124 is received. If, however, the state of a data object 112 has not changed for some time, the stored state 132 of the data object 112 may remain at the previous incorrect state for a while. To avoid this scenario, in the illustrated embodiment, computing device 100A sends a confirmation packet 920 via a connection 810A established using a reliable network protocol such as TCP.

In some embodiments, this confirmation packet 920 may be a baseline packet 122 including the complete state of a data object 112 (e.g., state C in FIG. 9), the last communicated update packet 124 (e.g., for range ΔA→C), or a packet that merely identifies the last state sent (e.g., indicating @C). To determine when to send a confirmation packet 920, in the illustrated embodiment, computing device 100A includes a timer 910 for maintaining a time value identifying an amount of time since the current state of the data object has changed. In response to the time value satisfying a threshold, computing device 100A sends, to computing device 100B, a packet 920 confirming the current state of the data object 112.

Figure 10:
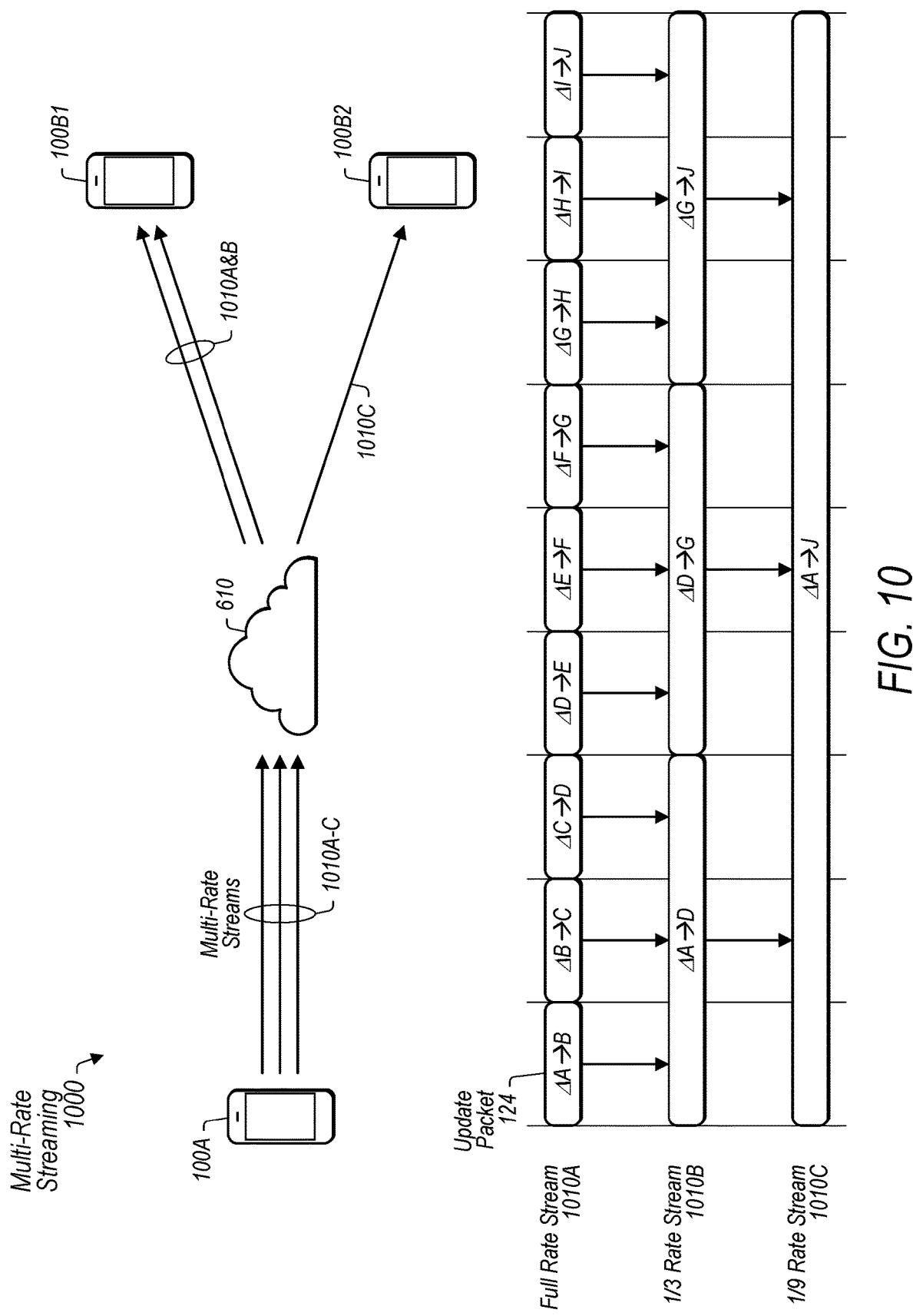
FIG. 10 is a block diagram illustrating an example of sending multi-rate streams.

Turning now to FIG. 10, a block diagram of multi-rate streaming 1000 is depicted. In a multicast communication, the connection quality may vary from one receiving device 100B to another. For example, some connections may have greater bandwidth, greater latency, and/or higher packet loss. In the illustrated embodiment, computing device 100A multicasts multiple streams/sequences 1010, each have update packets 124 supporting a respective range of previous states.

As shown, in some embodiments, streams 1010 may include a full-rate stream 1010A in which an update packet 124 is sent for each changing state and includes information 126 sufficient to update a stored state 132 to the next state. Streams 1010, however, may also include a third-rate stream 1010B including update packets 124 supporting a range of three previous states (e.g., ΔA→D) that can be updated to a current state and a ninth-rate stream 1010C including update packets 124 supporting a range of nine previous states (e.g., ΔA→J) that can be updated to a current state. An advantage of this approach is that packets of one stream (e.g., stream 1010B) may be used to help a computing device 100B update its stored state 132 without use a NACK packet 820 when packets 124 of another stream 1010 (e.g., stream 1010A) have been dropped. Also, packets 124 of a stream 1010 having a wider range may be sent less frequently than packets 124 of a stream 1010 with a narrower range. For example, stream 1010C may send one packet 124 for every three packets 124 sent with stream 1010B. Although receiving only stream 1010C may result in a computing device 100B missing some changing states, the less frequent communication of packets in stream 1010C may result in less bandwidth consumption, which may be desirable for some connections of recipients. Depending on a computing device 100B's particular connection quality, the computing device 100B may subscribe to one or more streams 1010. For example, computing device 100B1 receives streams 1010A and 1010B, but computing device 100B2 receives only stream 1010B2.

Figures 11A, 11B:
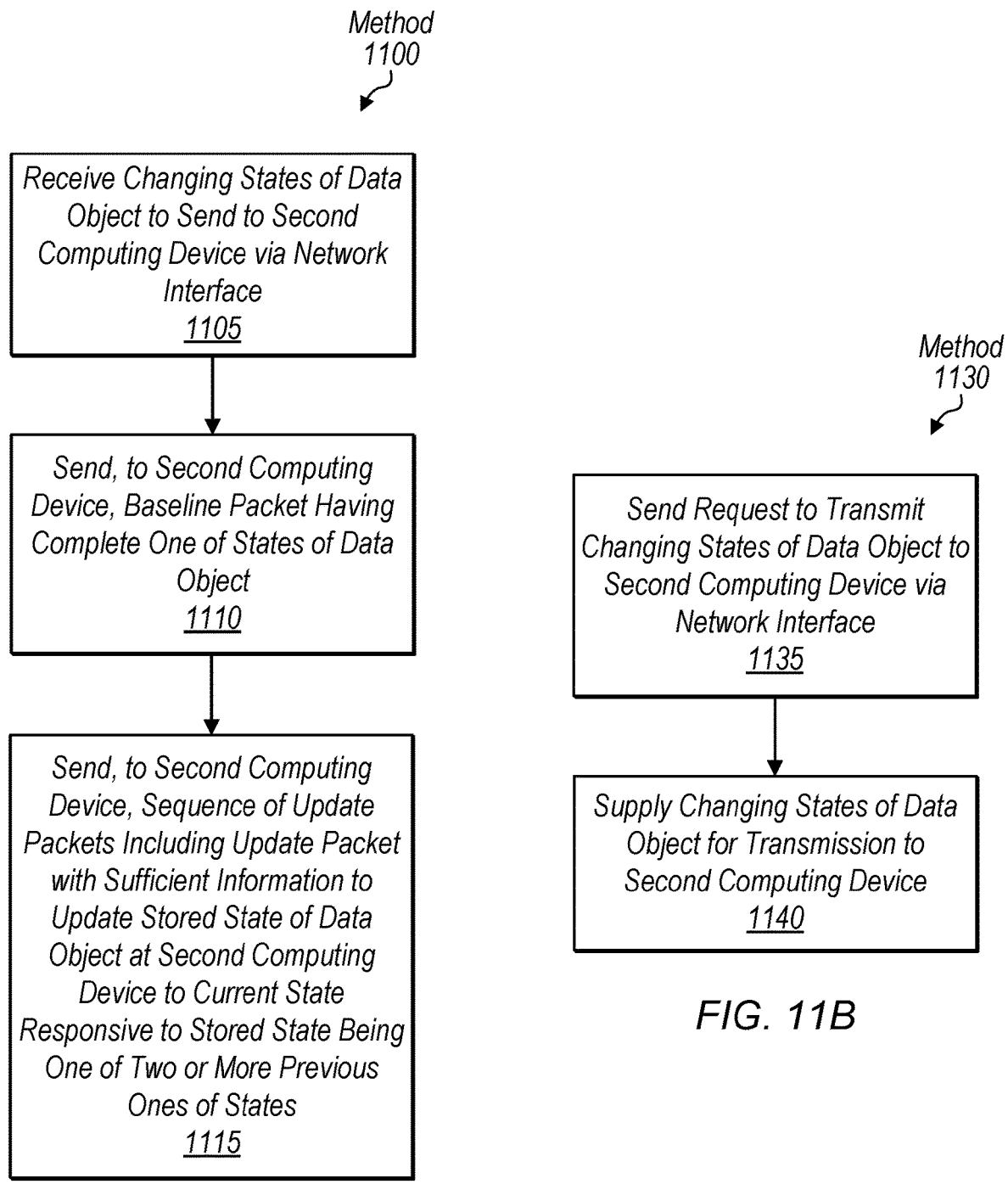
FIGS. 11A-11C are flow diagrams illustrating examples of methods for efficiently sending states of a data object.

Turning now to FIG. 11A, a flow diagram of a method 1100 is depicted. Method 1100 is one embodiment of a method that may be performed by a first computing device sending states of a data object such as computing device 100A. In many instances, performance of method 1100 may improve the ability of a communication to recover from dropped packets.

In step 1105, the first computing device receives changing states of a data object (e.g., data object 112) to send to a second computing device (e.g., computing device 100B) via a network interface (e.g., network interface 1250). In some embodiments, the receiving is via an application programing interface provided by an operating system of the first computing device to an application (e.g., application 110A) supplying the changing states of the data object.

In step 1110, the first computing device sends, to the second computing device, a baseline packet (e.g., baseline packet 122) having a complete one of the states of the data object.

In step 1115, the first computing device sends, to the second computing device, a sequence of update packets (e.g., update packets 124) corresponding to the changing states of the data object. In such an embodiment, an update packet in the sequence includes sufficient information (e.g., update information 126) to update a stored state (e.g., stored data-object state 123) of the data object at the second computing device to a current state of the data object responsive to the stored state being one of two or more previous ones of the states. In various embodiments, the first computing device determines the information to include in the update packet by comparing (e.g., via difference operations 210) the two or more previous states and the current state to identify differences and coalesces (e.g., coalesce operation 220) the differences into a payload for inclusion in the update packet. In some embodiments, the update packet identifies the two or more previous states (e.g., via an applicable range 420) for which the included information is usable by the second computing device to update the stored state to the current state. In some embodiments, the sequence of update packets includes a first update packet including sufficient information to update the stored state of the data object to a current state for a first range (e.g., applicable range 420A) of previous ones of the changing states, the sequence of update packets includes a second update packet including sufficient information to update the stored state of the data object to a current state for a second range (e.g., applicable range 420B) of previous ones of the changing states, and the first range overlaps with the second range.

In some embodiments, method 1100 further includes the first computing device determining, for the update packet, the information sufficient to update the stored state of the data object to the current state of the data object responsive to the stored state being one of the two previous states, determining, based on the determined information, an amount of additional information sufficient to update the stored state of the data object to the current state in response to the stored state being one of three previous states (e.g., within a stretched range 710), and in response to the amount of additional information being under a threshold amount, including the additional information in the update packet. In some embodiments, in response to two or more of the sequence of update packets being dropped, the first computing device receives a negative acknowledgment (e.g., NACK packet 820) from the second computing device and, based on the negative acknowledgment, sends, to the second computing device, another packet having another complete state of the data object. In some embodiments, the first computing device maintains a time value (e.g., in timer 910) identifying an amount of time since the current state of the data object has changed and, in response to the time value satisfying a threshold, sends, to the second computing device, a packet (e.g., confirmation packet 920) confirming the current state of the data object.

In various embodiments, method 1100 includes multicasting the sequence of update packets to a plurality of computing devices (e.g., computing devices 110B1 and 110B2) including the second computing device. In some embodiments, the multicasting includes sending the sequence of update packets via User Datagram Protocol (UDP), and the baseline packet is sent via transmission control protocol (TCP). In some embodiments, the first computing device multicasts a plurality of sequences (multi-rate streams 1010) of update packets corresponding to the changing states of the data object. In such an embodiment, the plurality of sequences includes a first sequence including a first update packet identifying a first range of previous ones of the changing states for which the first update packet includes information sufficient to update a stored state of the data object to a current state of the data object and a second sequence including a second update packet identifying a second range of previous ones of the changing states for which the second update packet includes information sufficient to update a stored state of the data object to a current state of the data object. In such an embodiment, the second range is a superset of the first range.

Turning now to FIG. 11B, a flow diagram of a method 1130 is depicted. Method 1130 is one embodiment of a method performed by an application executing on a first computing device and sending changing states of a data object such as application 110A. In some instances, performance of method 1130 may improve the reliability of the communication of these states.

In step 1135, the application sends a request to transmit changing states of a data object (e.g., data object 112) to a second computing device (e.g., computing device 100B) via a network interface (e.g., network interface 1250) of the first computing device. In some embodiments, the data object is a data structure that includes a plurality of primitive data types changed by the application over time.

In step 1140, the application supplies the changing states of the data object for transmission to the second computing device. In such an embodiment, the first computing device transmits, to the second computing device, a sequence of update packets (e.g., update packets 124) corresponding to the changing states of the data object, and an update packet in the sequence includes update information sufficient (e.g., update information 126) to update a stored state (e.g., stored data-object state 132) of the data object at the second computing device to a current state if the stored state is one of two or more of the supplied states prior to the current state. In some embodiments, the update information in the update packet is sufficient to update the stored state of the data object to a current state for a first range (e.g., applicable range 420A) of previous ones of the changing states, the sequence of update packets includes another update packet including sufficient information to update the stored state of the data object to a current state for a second range (e.g., applicable range 420B) of previous ones of the changing states, and the first range overlaps with the second range. In some embodiments, the sending and supplying are performed via application programming interface calls to an operating system of the first computing device that creates the update information from the supplied changing states.

In some embodiments, method 1130 further includes the application receiving changing states of another data object from the second computing device. In such an embodiment, the first computing device creates a current state of the other data object by applying update information to a stored state of the other data object, and the update information is received in an update packet having information sufficient to update the stored state of the other data object.

Figure 11C:
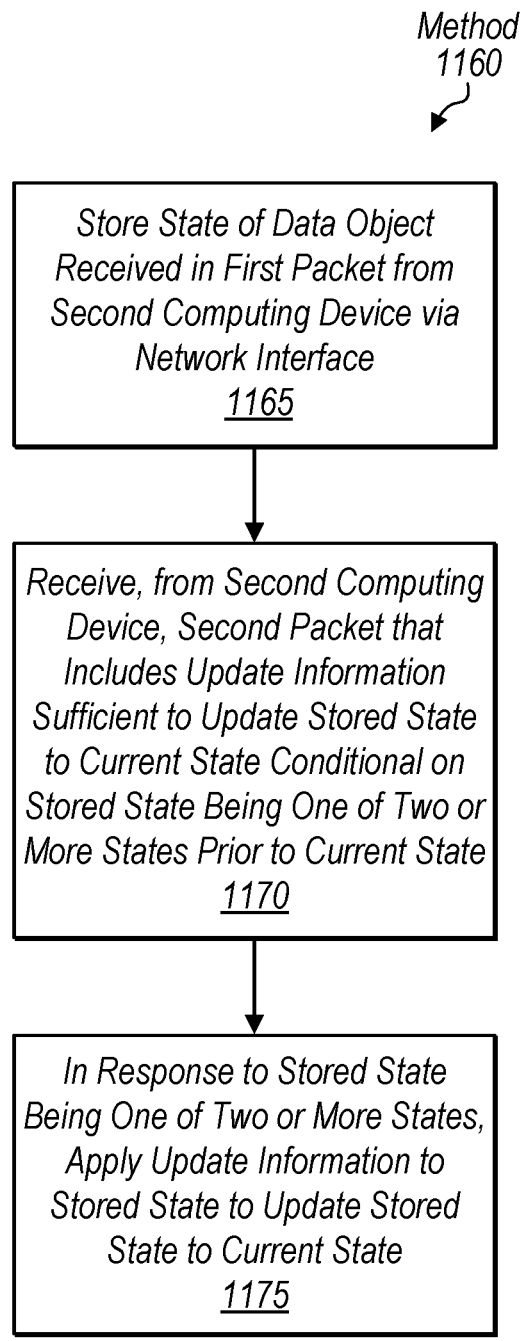

Turning now to FIG. 11C, a flow diagram of a method 1160 is depicted. Method 1160 is one embodiment of a method performed by a first computing device receiving changing states of a data object such as computing device 100B using decoder 130. In some instances, performance of method 1160 may mitigate the latency hit incurred when packets including information about those states are dropped.

In step 1165, the first computing device stores a state (e.g., stored data-object state 132) of a data object (e.g., data object 112) received in a first packet (e.g., baseline packet 122) from a second computing device (e.g., computing device 100A) via a network interface (e.g., network interface 1250).

In step 1170, the first computing device receives, from the second computing device, a second packet (e.g., an update packet 124) that includes update information (e.g., update information 126) sufficient to update the stored state of the data object to a current state of the data object conditional on the stored state being one of two or more states prior to the current state. In some embodiments, the first computing device receives, via a first reliable network protocol (e.g., via reliable connection 810A), the first packet including the stored state of the data object and receives, via a second unreliable network protocol (e.g., via unreliable connection 810B), the second packet as part of a multicast from the first computing device.

In step 1175, in response to the stored state of the data object being one of the two or more states, the first computing device applies (e.g., via apply operation 310) the update information to the stored state of the data object to update the stored state to the current state. In some embodiments, the first computing device determines whether the update information can be applied to the stored state by reading, from the second packet, a range (e.g., applicable range 420) of previous states for which the update information can be applied to produce the current state of the data object and determining whether the stored state of the data object is within the range. In some embodiments, in response to determining that the stored state of the data object is a state prior to the two or more states, the first computing device sends a negative acknowledgment (e.g., NACK packet 820) to the second computing device to cause the second computing device to send the current state of the data object. In various embodiments, the first computing device provides the current state of the data object to an application (e.g., application 110B) executing on the first computing device. In some embodiments, the current state of the data object is usable by the application to render content (e.g., XR view 1202) for display on the first computing device.

Figure 12:
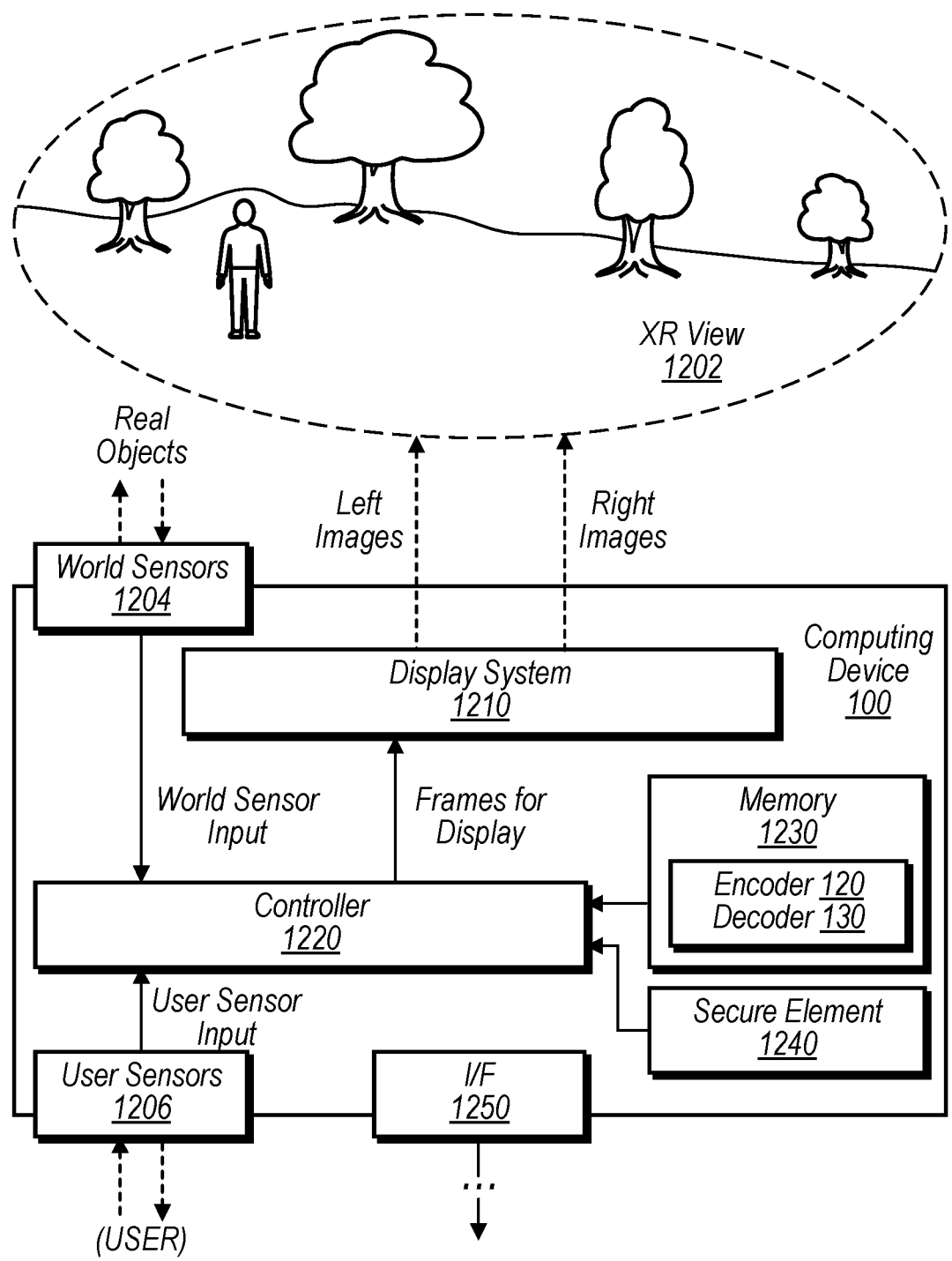
FIG. 12 is a block diagram illustrating an example of components that may be included in a computing device.

Turning now to FIG. 12, a block diagram of components within computing device 100 is depicted. In the illustrated embodiment, computing device 100 is configured to display content, such as an XR view 1202 of an XR environment, to a user and may be implemented as a head-mounted display (HMD) configured to be worn on the head. For example, device 100 may be a headset, helmet, goggles, glasses, a phone inserted into an enclosure, etc. worn by a user. As noted above, however, computing device 100 may correspond to other devices in other embodiments, which may not be presenting an XR environment. In the illustrated embodiment, device 100 includes world sensors 1204, user sensors 1206, a display system 1210, controller 1220, memory 1230, secure element 1240, and a network interface 1250. In some embodiments, device 100 may be implemented differently than shown. For example, device 100 may include multiple network interfaces 1250, device 100 may not include a secure element 1240, etc.

World sensors 1204, in various embodiments, are sensors configured to collect various information about the environment in which a user wears device 100. In some embodiments, world sensors 1204 may include one or more visible-light cameras that capture video information of the user's environment. This information also may, for example, be used to provide an XR view 1236 of the real environment, detect objects and surfaces in the environment, provide depth information for objects and surfaces in the real environment, provide position (e.g., location and orientation) and motion (e.g., direction and velocity) information for the user in the real environment, etc. In some embodiments, device 100 may include left and right cameras located on a front surface of the device 100 at positions that are substantially in front of each of the user's eyes. In other embodiments, more or fewer cameras may be used in device 100 and may be positioned at other locations.

In some embodiments, world sensors 1204 may include one or more world mapping sensors (e.g., infrared (IR) sensors with an IR illumination source, or Light Detection and Ranging (LIDAR) emitters and receivers/detectors) that, for example, capture depth or range information for objects and surfaces in the user's environment. This range information may, for example, be used in conjunction with frames captured by cameras to detect and recognize objects and surfaces in the real-world environment, and to determine locations, distances, and velocities of the objects and surfaces with respect to the user's current position and motion. The range information may also be used in positioning virtual representations of real-world objects to be composited into an XR environment at correct depths. In some embodiments, the range information may be used in detecting the possibility of collisions with real-world objects and surfaces to redirect a user's walking. In some embodiments, world sensors 1204 may include one or more light sensors (e.g., on the front and top of device 100) that capture lighting information (e.g., direction, color, and intensity) in the user's physical environment. This information, for example, may be used to alter the brightness and/or the color of the display system in device 100.

User sensors 1206, in various embodiments, are sensors configured to collect various information about a user wearing device 100. In some embodiments, user sensors 1206 may include one or more head pose sensors (e.g., IR or RGB cameras) that may capture information about the position and/or motion of the user and/or the user's head. The information collected by head pose sensors may, for example, be used in determining how to render and display views 1236 of the XR environment and content within the views. For example, different views 436 of the environment may be rendered based at least in part on the position of the user's head, whether the user is currently walking through the environment, and so on. As another example, the augmented position and/or motion information may be used to composite virtual content into the scene in a fixed position relative to the background view of the environment. In some embodiments there may be two head pose sensors located on a front or top surface of the device 100; however, in other embodiments, more (or fewer) head-pose sensors may be used and may be positioned at other locations. In some embodiments, user sensors 1206 may include one or more eye tracking sensors (e.g., IR cameras with an IR illumination source) that may be used to track position and movement of the user's eyes. In some embodiments, user sensors 1206 may include one or more hand sensors (e.g., IR cameras with IR illumination) that track position, movement, and gestures of the user's hands, fingers, and/or arms. For example, in some embodiments, detected position, movement, and gestures of the user's hands, fingers, and/or arms may be used to simulate movement of the hands, fingers, and/or arms of an avatar of the user in a co-presence experience.

Display system 1210, in various embodiments, is configured to display rendered frames to a user. Display 1210 may implement any of various types of display technologies. For example, as discussed above, display system 1210 may include near-eye displays that present left and right images to create the effect of three-dimensional view 1202. In some embodiments, near-eye displays may use digital light processing (DLP), liquid crystal display (LCD), liquid crystal on silicon (LCoS), or light-emitting diode (LED). As another example, display system 1210 may include a direct retinal projector that scans frames including left and right images, pixel by pixel, directly to the user's eyes via a reflective surface (e.g., reflective eyeglass lenses). To create a three-dimensional effect in view 1202, objects at different depths or distances in the two images are shifted left or right as a function of the triangulation of distance, with nearer objects shifted more than more distant objects. Display system 1210 may support any medium such as an optical waveguide, a hologram medium, an optical combiner, an optical reflector, or any combination thereof. In some embodiments, display system 1210 may be the transparent or translucent and be configured to become opaque selectively.

Controller 1220, in various embodiments, includes circuitry configured to facilitate operation of device 100. Accordingly, controller 1220 may include one or more processors configured to execute program instructions, such as those of applications 110, encoder 120, decoder 130, etc., to cause device 100 to perform various operations described herein. These processors may be CPUs configured to implement any suitable instruction set architecture, and may be configured to execute instructions defined in that instruction set architecture. For example, in various embodiments controller 1220 may include general-purpose or embedded processors implementing any of a variety of instruction set architectures (ISAs), such as ARM, x86, PowerPC, SPARC, RISC, or MIPS ISAs, or any other suitable ISA. In multi-processor systems, each of the processors may commonly, but not necessarily, implement the same ISA. Controller 1220 may employ any microarchitecture, including scalar, superscalar, pipelined, superpipelined, out of order, in order, speculative, non-speculative, etc., or combinations thereof. Controller 1220 may include circuitry to implement microcoding techniques. Controller 1220 may include one or more levels of caches, which may employ any size and any configuration (set associative, direct mapped, etc.).

In some embodiments, controller 1220 may include a GPU, which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 1220 may include one or more other components for processing and rendering video and/or images, for example image signal processors (ISPs), coder/decoders (codecs), etc. In some embodiments, controller 1220 may be implemented as a system on a chip (SOC).

Memory 1230, in various embodiments, is a non-transitory computer readable medium configured to store data and program instructions executed by processors in controller 1220 such as those of applications 110, encoder 120, decoder 130, etc. Memory 1230 may include any type of volatile memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. Memory 1230 may also be any type of non-volatile memory such as NAND flash memory, NOR flash memory, nano RAM (NRAM), magneto-resistive RAM (MRAM), phase change RAM (PRAM), Racetrack memory, Memristor memory, etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Secure element (SE) 1240, in various embodiments, is a secure circuit configured perform various secure operations for device 100. As used herein, the term "secure circuit" refers to a circuit that protects an isolated, internal resource from being directly accessed by an external circuit such as controller 1220. This internal resource may be memory that stores sensitive data such as personal information (e.g., biometric information, credit card information, etc.), encryptions keys, random number generator seeds, etc. This internal resource may also be circuitry that performs services/operations associated with sensitive data such as encryption, decryption, generation of digital signatures, etc. For example, SE 1240 may maintain one or more cryptographic keys that are used to encrypt data stored in memory 1230 in order to improve the security of device 100. As another example, secure element 1240 may also maintain one or more cryptographic keys to establish secure connections between computing devices 100, authenticate device 100 or a user of device 100, etc. As yet another example, SE 1240 may maintain biometric data of a user and be configured to perform a biometric authentication by comparing the maintained biometric data with biometric data collected by one or more of user sensors 1206. As used herein, "biometric data" refers to data that uniquely identifies the user among other humans (at least to a high degree of accuracy) based on the user's physical or behavioral characteristics such as fingerprint data, voice-recognition data, facial data, iris-scanning data, etc.

Network interface 1250, in various embodiments, includes one or more interfaces configured to communicate with external entities, which may include communicating packets 122 and 124. Network interface 1250 may support any suitable wireless technology such as WiFi®, Bluetooth®, Long-Term Evolution™, etc. or any suitable wired technology such as Ethernet, Fibre Channel, Universal Serial Bus™ (USB) etc. In some embodiments, interface 1250 may implement a proprietary wireless communications technology (e.g., 60 gigahertz (GHz) wireless technology) that provides a highly directional wireless connection. In some embodiments, device 100 may select between different available network interfaces based on connectivity of the interfaces as well as the particular user experience being delivered by device 100. For example, if a particular user experience requires a high amount of bandwidth, device 100 may select a radio supporting the proprietary wireless technology when communicating wirelessly to stream higher quality content. If, however, a user is merely a lower-quality movie, Wi-Fi® may be sufficient and selected by device 100. In some embodiments, device 100 may use compression to communicate in instances, for example, in which bandwidth is limited.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored therein that are executable by a first computing device to perform operations comprising:
   receiving state information indicative of a plurality of changing states of a data object;
   sending, to a second computing device, a baseline packet that includes information indicative of a baseline state of the plurality of changing states of the data object; and
   sending, to the second computing device over a network using one or more messaging protocols, a sequence of update packets indicative of changes to the data object occurring after the baseline state, wherein the sequence of update packets includes one or more update packets, a given one of which includes:
      information indicative of a new state change not included in prior update packets in the sequence; and
      one or more previous state changes also included in prior update packets; and
   wherein the sequence of update packets is usable by the second computing device to update a stored state of the data object to a current state of the data object.

2. The computer readable medium of claim 1, wherein the operations further comprise:
   determining the information to include in a particular update packet of the sequence by:

comparing two or more previous states and the current state of the data object to identify differences; and
coalescing the differences into a payload for inclusion in the particular update packet; and
wherein the particular update packet identifies the two or more previous states for which the included information is usable by the second computing device to update the stored state to the current state.

3. The computer readable medium of claim 1, wherein the operations further comprise:
determining, for a particular update packet in the sequence, information sufficient to update the stored state of the data object to the current state of the data object responsive to the stored state being one of two previous states;
based on the determined information, determining an amount of additional information sufficient to update the stored state of the data object to the current state in response to the stored state being one of three previous states; and
in response to the amount of additional information being under a threshold amount, including the additional information in the particular update packet.

4. The computer readable medium of claim 1, wherein the operations further comprise:
in response to two or more update packets in the sequence being dropped, receiving a negative acknowledgment from the second computing device; and
based on the negative acknowledgment, sending, to the second computing device, another packet having another complete state of the data object.

5. The computer readable medium of claim 1 wherein the operations further comprise:
multicasting the sequence of update packets to a plurality of computing devices including the second computing device.

6. The computer readable medium of claim 1, wherein the one or more messaging protocols include User Datagram Protocol (UDP) and Transmission Control Protocol (TCP), wherein the baseline packet is sent via TCP, and wherein the sequence of update packets is sent via UDP.

7. The computer readable medium of claim 5, wherein the multicasting includes:
multicasting a plurality of sequences of update packets corresponding to a plurality of changing states of the data object, wherein the plurality of sequences includes:
a first sequence including a first update packet identifying a first range of previous states in a plurality of changing states for which the first update packet includes information sufficient to update a stored state of the data object to a current state of the data object; and
a second sequence including a second update packet identifying a second range of previous states in a plurality of changing states for which the second update packet includes information sufficient to update a stored state of the data object to a current state of the data object; and
wherein the second range is a superset of the first range.

8. The computer readable medium of claim 1, wherein the sequence of update packets includes an initial update packet distinct from the one or more update packets, the initial update packet including information indicative of one or more new state changes not included in the baseline packet and not including any previous state changes.

9. The computer readable medium of claim 1, wherein the operations further comprise:
maintaining a time value identifying an amount of time since the current state of the data object has changed; and
in response to the time value satisfying a threshold, sending, to the second computing device, a packet confirming the current state of the data object.

10. The computer readable medium of claim 1, wherein the receiving is via an application programing interface provided by an operating system of the first computing device to an application supplying the changing states of the data object.

11. A method, comprising:
sending, by an application executing on a first computing device, a request to transmit state information indicative of a plurality of changing states of a data object to a second computing device over a network using one or more messaging protocols; and
supplying, by the application, the state information for transmission to the second computing device, such that a sequence of update packets indicative of changes to the data object occurring after a baseline state are transmitted by the first computing device to the second computing device, wherein the sequence includes one or more update packets, a given one of which includes:
information indicative of a new state change not included in prior update packets in the sequence; and
one or more previous state changes also included in prior update packets; and
wherein the sequence of update packets is usable by the second computing device to update a stored state of the data object to a current state of the data object.

12. The method of claim 11, wherein the sequence of update packets includes a first update packet indicative of changes to the data object sufficient to update the stored state of the data object to a current state for a first range of previous states in the plurality of changing states;
wherein the sequence of update packets includes another update packet indicative of changes to the data object sufficient to update the stored state of the data object to a current state for a second range of previous states in the plurality of changing states; and
wherein the first range overlaps with the second range.

13. The method of claim 11, further comprising:
receiving, by the application, state information indicative of a plurality of changing states of another data object from the second computing device, wherein the first computing device creates a current state of the other data object by applying update information to a stored state of the other data object, wherein the update information is received in an update packet having information sufficient to update the stored state of the other data object.

14. The method of claim 11, wherein the sending and supplying are performed via application programming interface calls to an operating system of the first computing device that creates the one or more update packets from the supplied state information indicative of the plurality of changing states of the data object.

15. The method of claim 11, wherein the data object is a data structure that includes a plurality of primitive data types changed by the application over time.

16. A non-transitory computer readable medium having program instructions stored therein that are executable by a recipient computing device to perform operations comprising:

storing a state of a data object received in a first packet from a sending computing device over a network using one or more messaging protocols;

receiving, from the sending computing device via the one or more messaging protocols, a second packet in a sequence of update packets that includes update information indicative of changes to the data object occurring after changes indicated in the first packet, the update information including:

information indicative of a new state change not included in a prior packet in the sequence; and one or more previous state changes previously included in prior update packets in the sequence; and wherein the update information is usable by the recipient computing device to update the stored state of the data object to a current state of the data object.

17. The computer readable medium of claim 16, wherein the operations further comprise:

determining whether the update information can be applied to the stored state by:

reading, from the second packet, an indication of a range of previous states for which the update information can be applied to produce the current state of the data object; and determining whether the stored state of the data object is within the indicated range.

18. The computer readable medium of claim 16, wherein the operations further comprise:

in response to determining that the stored state of the data object is a state prior to a particular range of states, sending a negative acknowledgment to the sending computing device to cause the sending computing device to send the current state of the data object.

19. The computer readable medium of claim 16, wherein the operations further comprise:

receiving, via a first reliable network protocol, the first packet including the stored state of the data object; and receiving, via a second unreliable network protocol, the second packet as part of a multicast from the recipient computing device.

20. The computer readable medium of claim 16, wherein the operations further comprise:

providing the current state of the data object to an application executing on the recipient computing device, wherein the current state of the data object is usable by the application to render content for display on the recipient computing device.

* * * * *